United States Patent

Scott, Jr.

[15] 3,703,600

[45] Nov. 21, 1972

[54] METHOD OF STARTING ELECTROSLAG REMELTING PROCESS WITH MOLTEN SLAG

[72] Inventor: William W. Scott, Jr., Parkesburg, Pa.

[73] Assignee: Lukens Steel Company, Coatesville, Pa.

[22] Filed: Dec. 29, 1971

[21] Appl. No.: 213,561

[52] U.S. Cl............................................13/9, 13/34
[51] Int. Cl.................................................H05b 3/60
[58] Field of Search...............13/9, 9 ES, 34; 219/73

[56] References Cited

UNITED STATES PATENTS 3,389,208  6/1968  Roberts et al..............13/9 ES
3,654,373  4/1972  Savor.........................13/9 ES Primary Examiner—Roy N. Envall, Jr.
Attorney—Mason, Mason & Albright

[57] ABSTRACT

The starting up of an electroslag remelting process with molten slag, the volume of such slag being inherently variable within determinable limits, by positioning the bottom of the electrode preferably not more than 2 inches above the maximum anticipated slag level, charging the molten slag into the bottom of the mold within a period of preferably 1 to 4 minutes, and immediately thereafter with voltage applied to the electrode, lowering same at a speed of between 5 and 30 seconds per inch until contact is made with the top of the slag and a current flow is registered, the slag becoming highly fluid within a few minutes thereafter.

7 Claims, 3 Drawing Figures

METHOD OF STARTING ELECTROSLAG REMELTING PROCESS WITH MOLTEN SLAG

BACKGROUND OF THE INVENTION

This invention relates to a process of producing high-quality specialty steels and non-ferrous alloys, known as the electroslag remelting (ESR) process, wherein a molten slag or molten flux start is employed.

The electroslag remelting process basically comprises the fusing from a consumable electrode metal which is to be refined under a blanket of molten slag or flux. This is generally accomplished by suspending a consumable electrode within a water cooled copper or steel mold and introducing molten slag into the mold, this slag acting as a conductor for electrical current passing between the consumable electrode and the baseplate or stool. This current through the electrode and molten slag heats the electrode and droplets of metal fusing off its lower end fall through the slag to the bottom of the mold where a pool of molten metal forms and solidifies upwards from the bottom of the pool. A refining action takes place on the molten metal as it passes through the molten slag and, as the electrode is progressively consumed, refined metal builds up from the bottom of the mold to form an ingot. The molten slag floats on the pool of refined metal and remains in contact with the lower end of the consumable electrode. The refining process is continued until the electrode is consumed or substantially consumed. Slag used in electroslag remelting process has, when in solid form, a high dielectric constant and, although it is conductive to some extent, it becomes sufficiently conductive for its purpose only when in the molten form. Although many furnaces employ a "cold" start, wherein solid slag or flux in the bottom of the mold is heated until molten, most modern ESR furnaces employ some form of molten slag or molten flux start. In such method, slag or flux is melted in a separate container and introduced into the bottom of the mold through the top of the mold between the consumable electrode and the mold, through an opening in the consumable electrode, via a channel running beneath the mold, through a channel at the base of the mold, or through a hole in the mold at some point above the stool or base.

A problem which has caused difficulty when molten slag or flux is introduced into the mold arises from the circumstance that the volume of slag or flux so introduced is difficult to pre-gauge with precision. If the slag introduced into the mold is insufficient, solidification may start to take place on the top of the slag before the problem is ascertained and the necessary adjustment is made. However, if the amount of slag or flux introduced is too great, it tends to rise rapidly between the electrode and the mold wall where it solidifies and interferes with load cell reading of the weight of the electrode and may act as an electric arc initiator for arcing between the electrode and the mold. In large installations, it may take two or more hours to remelt the slag so solidified completely.

SUMMARY OF THE INVENTION

I have discovered that a start up may be obtained in the electroslag remelting process without the above problems if initially a determination is made of the probable variability of the volume of molten slag introduced into the bottom of the mold and start ups are made with the electrode positioned about 2 inches above the level of the slag within the mold assuming that the maximum of the probable volume variables of slag is introduced into the mold. Thus, the bottom of the electrode is positioned at a distance above the bottom of the mold which is slightly greater than the anticipated depth of the slag which will be poured. With the molten slag so positioned under the bottom of the electrode, I have found that with the voltage applied to the electrode it may be lowered slowly until it contacts the surface of the slag and a current flow is registered. By commencing the lowering of the electrode promptly after the slag has been poured into the mold, such crust, if any, as may have formed on the top of the slag has been found insufficient to interfere with the process once contact by the electrode is made, and the slag is highly liquid within a few minutes after start up without displacement of the slag occurring between the mold wall and the electrode. This permits highly accurate load cell weighings and alleviates arcing problems which may take place between the electrode and slag solidified between its side and the mold.

Other adaptabilities and capabilities will appear as the description progresses, reference being had to the accompanying drawings in which:

DESCRIPTION OF THE PREFERRED EMBODIMENT

Figure 1:
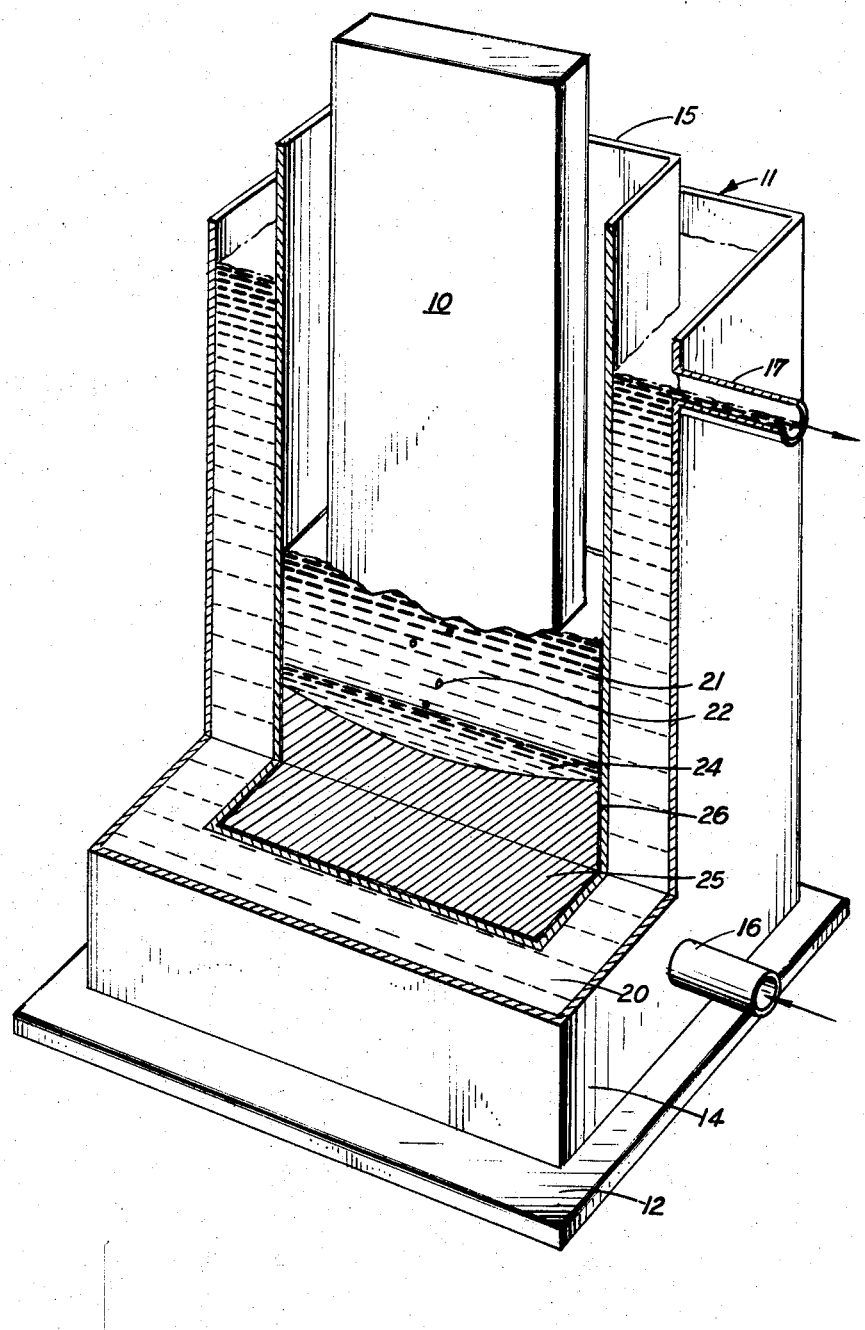
FIG. 1 shows an isometric view, in partial section of a consumable electrode in a typical ESR mold.

Referring now to FIG. 1, a consumable electrode 10, which in this case is rectangular in cross-section but may also be circular, is suspended by suitable lifting and lowering means (not shown) in a water cooled copper or steel mold designated generally by reference number 11. The mold 11 is supported by a base plate or stool 12 and comprises an outer shell 14, an inner mold wall 15, and an inlet 16 and outlet 17 for a cooling fluid 20, which in this case is water. The interior dimension of mold 11 within walls 15 is on the order of 20 by 60 inches across and about 115 inches high. The electrode 10 is manufactured so that it can be centered between walls 15 with about 1½ and 2 inches on each side. The cap 21 of molten slag or flux receives the lower end of electrode 10 and, due to heat generated by electric current passing through electrode 10 and cap 21, the lower end of the electrode 10 is progressively melted and molten metal droplets 22 fall through cap 21 to form a molten metal pool 24, which, due to the cooling effects of fluid 20, solidifies to form an ingot 25. As cap 21 raises due to the transfer of metal from electrode 10 to pool 24 and ingot 25, a relatively thin solidified slag layer 26 forms on the inside of mold wall 15 which has a thickness of about 1/16 to ⅛ inches and tends to insulate cap 21, metal pool 24 and finally ingot 25 both thermally and electrically from the interior mold wall 15. Thus, electrical current received by electrode 10 passes almost in its entirety to cap 21, metal pool 24 and ingot 25 into stool 12.

Figure 2:
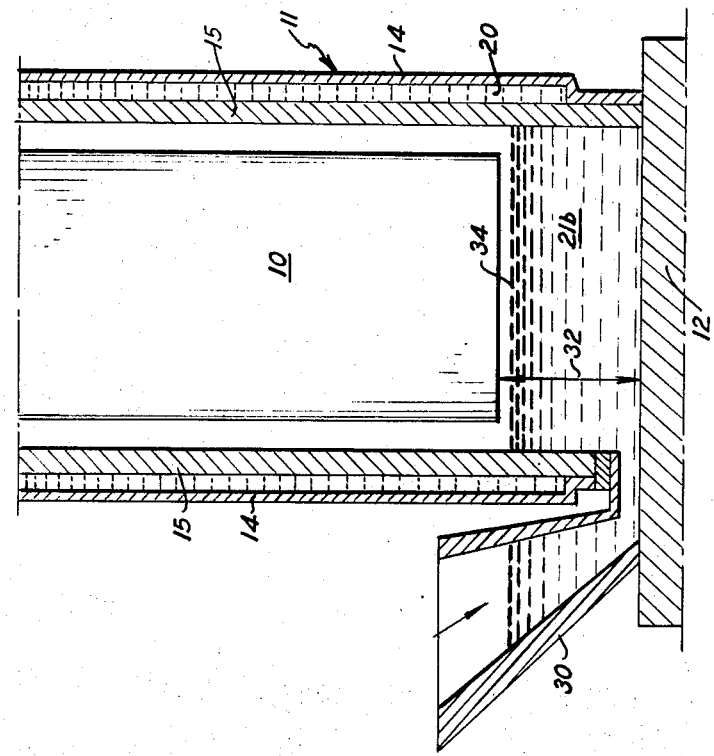
FIG. 2 illustrates, in section, the method of the prior art wherein the molten slag is introduced into the mold with the power applied to the consumable electrode.

FIG. 2 discloses the prior art start up where molten slag 21a is introduced into the bottom of mold 11. Initially, power is applied to the electrode 10 and, due to the fact that the volume of slag poured in the bottom of the mold is unknown to some extent, the electrode 10 was customarily positioned a distance 27 from stool 12 which underestimated the amount of slag to be received into the bottom of mold 11 via funnel 30 inasmuch as it was necessary for the level of the liquid slag to reach the bottom of electrode 10 to start the electroslag remelting process. However, it frequently occurs that there was more slag than required for this purpose and with one inch of extra slag, 6 vertical inches of solidified slag may occur between the electrode and mold wall at a location as indicated by reference numeral 31 in FIG. 2. As previously indicated, this slag which solidifies rapidly because both wall 15 and electrode 10 are relatively cool, interferes with the load cell readings which show the weight of the electrode and, moreover, such solidified slag 31 may act as electric arc initiator for arcing between the electrode and the mold. In either event, the process is, at best, substantially impeded and less efficient.

The reasons for variability in the amount of slag which is used from one melt to the next are largely due to the inclusion of slag skull in the slag melting furnace; spillage; and erroneous weighings. In actual practice, it was found that slag depth in mold 11 from a supposedly uniform amount of dry slag material would vary as much as 3 inches.

Inasmuch as before and immediately after current commences passing, the cap 21, the mold 11, the stool 12, and the lower end of electrode 10 are relatively cool, it was considered necessary that contact between cap 21 and electrode 10 should be made without any delay. Should undue delay occur, a crust or lining of solid slag generally forms on the top of cap 21 which tends to insulate the molten slag or flux from stool 12 and mold 11 whereby the necessary melting process might not start without plunging electrode 10 through such crust. Also the problem is aggravated by lowering electrode 10 too rapidly for if it is immersed up to 1 inch in the molten slag, the situation shown in FIG. 2 arises whereby the slag raises about 6 inches along the sides of the electrode 10 and solidifies to cause substantial problems.

Figure 3:
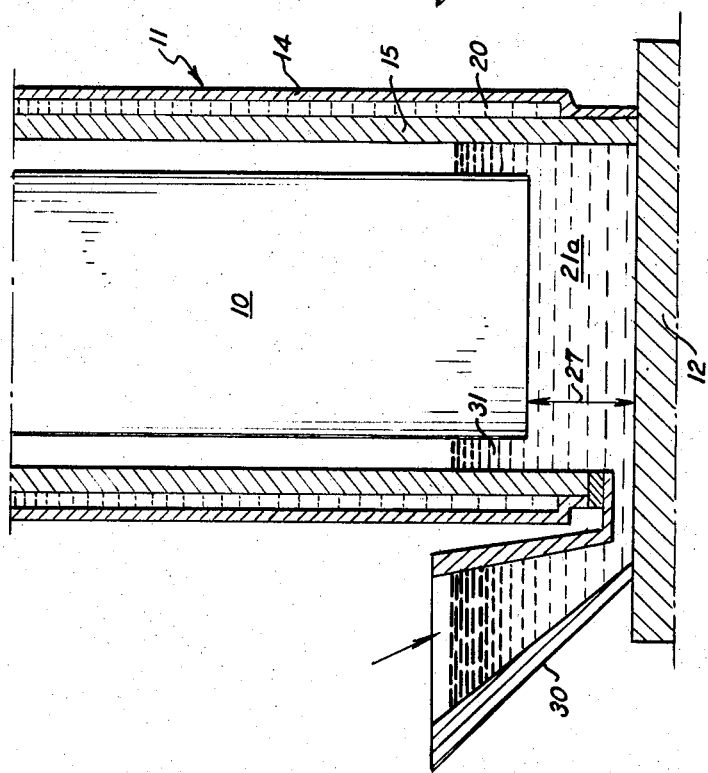
FIG. 3 is a similar cross-sectional view of a mold as utilized in the electroslag remelting process which illustrates the starting position of the electrode in the method of the invention.

I have discovered, however, that if the electrode is initially positioned a short but sufficient distance above the highest level of slag expected with knowledge of the variability parameters of the molten slag charges (distance 32 as shown in FIG. 3, the highest level of slag charge 21b being indicated at 34) then if electrode 10 is energized and a prompt slow lowering of electrode 10 is commenced, at say 1 inch per 5 to 30 seconds, until it contacts slag surface 34, a current flow is immediately registered and slag 21b is highly liquid within a few minutes after such start up. An initial voltage of about 80 volts reduces within a few minutes at most to about 50 volts with an amperage in the order of 10,000 amps. As a result, the load cell weighings are accurate and arcing problems which would otherwise occur due to slag incursions 31 are absent. The electroslag remelting process is thereby improved substantially on an average and an ingot with a more uniform surface results. In practice, electrode 10 may be energized prior to or as the slag is charged into mold 11, or immediately before lowering same. However, preferably, it is energized as the slag is charged into the mold. Also, preferably, the slag charging time via funnel 30 should not exceed 4 minutes.

For the purposes of the claims, flux is to be considered in the term "slag."

Having thus described my invention, what I claim as new and desire to secure by Letters Patent of the United States is:

1. A method of starting up an electroslag remelting process which utilizes a molten slag charge wherein the amount of slag initially charged into the mold is variable within known parameters, said method comprising the steps of positioning the bottom of a consumable electrode a predetermined distance above the base plate of the mold which is slightly above the predetermined highest level of the initial charge of molten slag, charging molten slag into the mold whereby its surface is below the surface of the consumable electrode and, immediately upon completion thereof, providing for the slow lowering of the electrode until it contacts the slag surface and a current flow through the slag is established.

2. A method in accordance with claim 1 wherein the electrode is energized with electrical voltage prior to introducing the molten slag into the mold.

3. A method in accordance with claim 1 wherein the electrode is energized with electrical voltage during the time that the molten slag is introduced into the mold.

4. A method in accordance with claim 1 wherein the electrode is lowered into the slag at a rate of not greater than one inch every 5 seconds.

5. A method in accordance with claim 1 wherein the step of charging molten slag into the mold is accomplished in a period of not greater than 4 minutes.

6. A method in accordance with claim 1 wherein said predetermined distance is not greater than about 2 inches above the predetermined highest level of the initial charge of molten slag.

7. A method of starting up an electroslag remelting process which comprises premelting slag having a volume within known limits, positioning the bottom of a consumable electrode a distance above the base of a water cooled mold whereby said bottom is preferably not more than 2 inches above the highest volume within said limits of said slag when received in the bottom of said mold, charging said slag into said mold in a period not exceeding four minutes and, immediately upon completion thereof, lowering said electrode at a rate not greater than one inch per 5 seconds until it contacts the slag surface and a current flow through said slag is established.

* * * * *